(12) United States Patent
Wang et al.

(10) Patent No.: US 10,016,729 B2
(45) Date of Patent: Jul. 10, 2018

(54) ANTIBACTERIAL AND ANTIFOULING POLYMERIC SEPARATION MEMBRANE AND PREPARATION METHOD THEREOF

(71) Applicant: TONGJI UNIVERSITY, Shanghai (CN)

(72) Inventors: Zhiwei Wang, Shanghai (CN); Mei Chen, Shanghai (CN); Xingran Zhang, Shanghai (CN); Xueye Wang, Shanghai (CN); Junjian Zheng, Shanghai (CN); Chen Pan, Shanghai (CN); Zhichao Wu, Shanghai (CN); Qiaoying Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 15/362,991

(22) Filed: Nov. 29, 2016

(65) Prior Publication Data

US 2017/0095775 A1    Apr. 6, 2017

(30) Foreign Application Priority Data

Mar. 2, 2016    (CN) .......................... 2016 1 0119125

(51) Int. Cl.
  *B01D 71/34*    (2006.01)
  *B01D 71/42*    (2006.01)
  (Continued)

(52) U.S. Cl.
  CPC ...... *B01D 67/0013* (2013.01); *B01D 67/0011* (2013.01); *B01D 67/0016* (2013.01);
  (Continued)

(58) Field of Classification Search
  CPC .... B01D 67/0013; B01D 71/42; B01D 71/36; B01D 67/0011; B01D 71/68; B01D 71/34;
  (Continued)

(56) References Cited

U.S. PATENT DOCUMENTS

| 5,147,553 | A  | * | 9/1992  | Waite | B01D 69/125 210/490 |
| 7,459,171 | B2 | * | 12/2008 | Cevc  | A61K 9/1272 210/321.75 |

(Continued)

FOREIGN PATENT DOCUMENTS

| CN | 101396642 | A | * | 4/2009 |
| CN | 101402023 | A | * | 4/2009 |

(Continued)

*Primary Examiner* — Pamela H Weiss
(74) *Attorney, Agent, or Firm* — Hauptman Ham, LLP

(57) ABSTRACT

This invention provides a polymeric separation membrane that has excellent durable antibacterial effect and stain resistance, and a preparation method thereof. The polymeric separation membrane can be widely applied for water treatment, which belongs to the field of water treatment and membrane separation science and technology. The polymeric separation membrane containing quaternary ammonium salt is prepared by the immersion precipitation phase inversion method, using quaternary ammonium salt mixed with polymer and additives. This modification method effectively improves the antibacterial and antifouling ability of the polymeric separation membrane prolongs the service life of membranes and significantly inhibits the reproduction of bacterial and microbial. The preparation method has the advantages of simple process, easy operation, easy for promotion, and also avoids expensive equipment. The polymeric separation membrane has great antibacterial ability and stain resistance, therefore, it has potential application in the field of water treatment.

3 Claims, 2 Drawing Sheets

(51) Int. Cl.
  *B01D 67/00* (2006.01)
  *B01D 71/68* (2006.01)
  *B01D 69/02* (2006.01)
  *B01D 69/06* (2006.01)
  *B01D 71/36* (2006.01)
  *B01D 65/08* (2006.01)
  *C02F 1/44* (2006.01)

(52) U.S. Cl.
  CPC .............. *B01D 69/02* (2013.01); *B01D 69/06* (2013.01); *B01D 71/34* (2013.01); *B01D 71/36* (2013.01); *B01D 71/42* (2013.01); *B01D 71/68* (2013.01); *B01D 65/08* (2013.01); *B01D 2323/12* (2013.01); *B01D 2325/48* (2013.01); *C02F 1/44* (2013.01)

(58) Field of Classification Search
  CPC .... B01D 69/06; B01D 69/02; B01D 67/0016; B01D 2325/48; B01D 2323/12; B01D 65/08
  See application file for complete search history.

(56) References Cited

U.S. PATENT DOCUMENTS

| | | | | |
|---|---|---|---|---|
| 9,724,649 | B2* | 8/2017 | Stasiak | B01D 69/06 |
| 2002/0127474 | A1* | 9/2002 | Fleischer | B01D 53/228 |
| | | | | 429/309 |
| 2008/0171156 | A1* | 7/2008 | Olijve | B01D 67/0006 |
| | | | | 428/32.26 |
| 2009/0205116 | A1* | 8/2009 | Stone | A01N 25/10 |
| | | | | 2/455 |
| 2010/0077529 | A1* | 4/2010 | Stone | A41D 31/0083 |
| | | | | 2/85 |
| 2012/0285882 | A1* | 11/2012 | Teoh | B01D 69/06 |
| | | | | 210/500.22 |
| 2013/0203873 | A1* | 8/2013 | Linder | B01D 67/0006 |
| | | | | 521/27 |

FOREIGN PATENT DOCUMENTS

| | | |
|---|---|---|
| CN | 104190274 A | 12/2014 |
| CN | 104524986 A | 4/2015 |

* cited by examiner

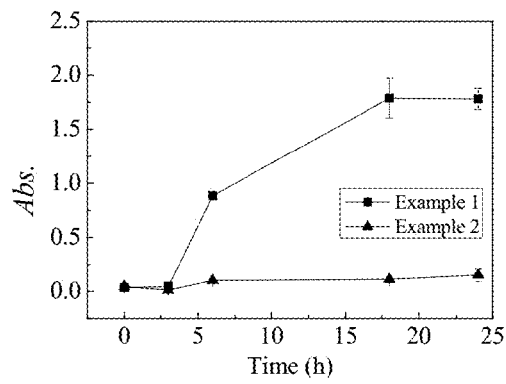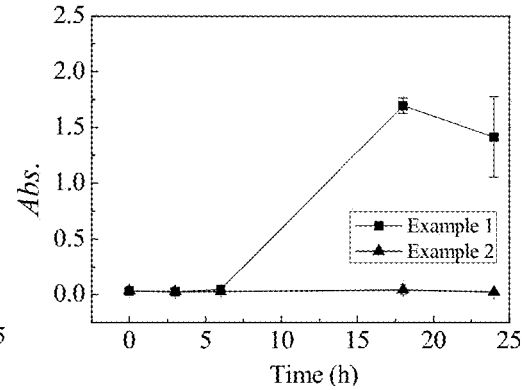
FIG.1A  FIG.1B
FIG. 1
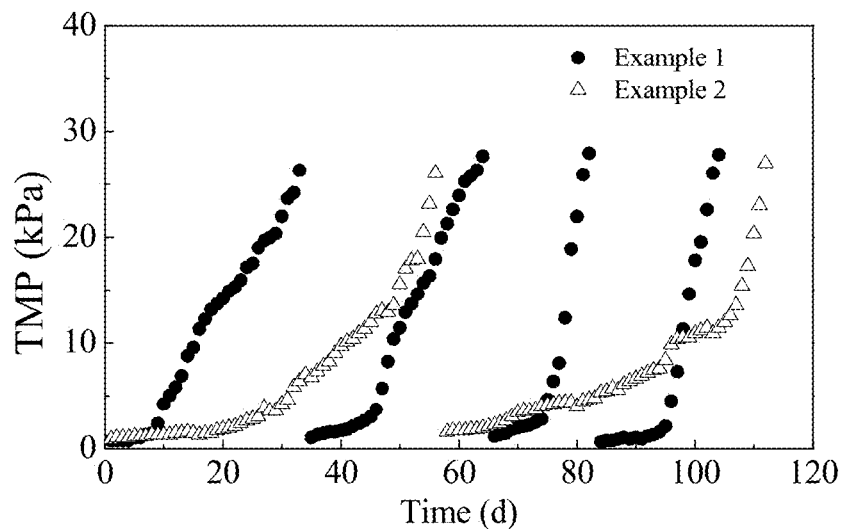
FIG.2

ANTIBACTERIAL AND ANTIFOULING POLYMERIC SEPARATION MEMBRANE AND PREPARATION METHOD THEREOF

TECHNICAL FIELD

The invention relates to the field of water treatment and membrane separation technology, more particularly, to antibacterial and antifouling polymeric separation membrane and preparation method thereof.

BACKGROUND OF THE INVENTION

With the development and popularization of membrane separation technology, requirements to the high performance of membrane are ever-increasing. Because of the excellent thermal stability, chemical stability, acid and alkali resistance, erosion-resistant of microbe and oxidation resistance, some polymers have become one of the important components in the membrane materials. However, the membrane fouling is still a major problem in the development of membrane separation technology. Especially the membrane fouling that is caused by the adhesion and growth of bacteria on the surface of the membrane during the filtration, resulting in the reduction of membrane separation performance and sharp decrease of the membrane flux, which limits the application of membrane in many aspects. In the field of membrane preparation, therefore, it is crucial to prepare new membrane materials, modify the physical and chemical properties of membrane materials, enhance the antibacterial properties and antifouling capacity of membrane.

At present, there are a lot of reports about the antibacterial and antifouling modification for polymeric separation membrane. For example, CN104524986A describes processes to prepare the hydrophilic antimicrobial membrane: immersing the basal membrane in the aqueous solution of dopamine to form a polydopamine layer on the membrane surface via self-assembly of dopamine, and reacting with the aqueous solution of polyethyleneimine to get the hydrophilic antimicrobial membrane via cationization. In CN104190274A, the silver nano-particle/Zwitterion polymer brush grafted polyvinylidene fluoride membrane were prepared by using polyvinylidene fluoride (PVDF), Silver ion, and zwitterion monomer as the raw materials, which has antibacterial activity. But the modification mentioned above, usually attained by surface deposition, grafting, layer-by-layer self-assembly or cross-linking to combine the inorganic small molecule or organic macromolecule antibacterial agent with the functional membrane material. These modification methods are complex and not conducive to commercial production. In addition, the modified layer is easy to take off, which leads to the loss of antifouling capacity. The antibacterial effect of the modified membrane has not been tested by long-term experiment. Therefore, it needs to be further verified whether the modified membrane has a long-term antibacterial and antifouling capability.

As a kind of well-known bactericide, quaternary ammonium salt is widely used in water treatment and petroleum mining industry. The mechanism of this bactericide is sterilization by contact. In details, bactericide as cationic monomer adsorbs the negatively charged bacteria and gathers in the cell wall by electrostatic force, hydrogen bond and interaction of surfactant and protein molecules, which forms the steric effect, leads to inhibition of bacterial growth and death.

Therefore, this kind of bactericide display high efficiency, low toxicity, resistance to variety of pH, chemical stability and easy to use. With such benefits, the bactericide is suitable for resisting adhesion of microorganisms on the membrane surface, thereby preventing fouling of the membrane surface by microorganism and its secretion.

SUMMARY OF THE INVENTION

The invention provides a polymeric separation membrane with antibacterial ability, antifouling capability and a preparation method.

In this invention, the quaternary ammonium salt is blended into the membrane substrate to obtain the membrane with persistent antibacterial ability and antifouling capability. The modified polymeric separation membrane has low cost, and enhanced antibacterial and antifouling ability. The invention has the advantages of simple process, easy operation, no need of expensive equipment, easy promotion, which provides technical support for commercial application of separation membrane materials with antibacterial ability and antifouling capability in the water treatment. So far, there is very limited study of using quaternary ammonium salt to prepare the modified polymer membrane materials with antibacterial ability and antifouling capability.

BRIEF DESCRIPTION OF THE DRAWINGS

FIG. 1 is graphical representation of antibacterial effect of the polymeric separation membrane made by Example 1 and 2 for *Escherichia coli, Staphylococcus aureus* for 24 hrs; FIG. 1A is a graph indicating the absorbance changes within different culture durations for medium containing *Escherichia coli* at UV 600 nm; and FIG. 1B is a graph indicating the absorbance changes within different culture durations for medium containing *Staphylococcus aureus* at UV 600 nm.

FIG. 2 is a graph indicating transmembrane pressure (TMP) changes of the long-term operated membrane bioreactor in Example 4 using the polymeric separation membrane made by Example 1 and 2.

FIG. 3A is a confocal microscopy (CLSM) graph indicating the content and distribution of foulants on membrane surface made by Example 1, and the stained part is α-sugar/protein; FIG. 3B is a confocal microscopy (CLSM) graph indicating the content and distribution of living cells on membrane surface made by Example 1, and the stained part is living cells; FIG. 3C is a confocal microscopy (CLSM) graph indicating the content and distribution of foulants on membrane surface made by Example 2, and the stained part is α-sugar/protein; and FIG. 3D is a confocal microscopy (CLSM) graph indicating the content and distribution of living cells on membrane surface made by Example 2, and the stained part is living cells.

DETAILED DESCRIPTION OF THE INVENTION

Figure 3:
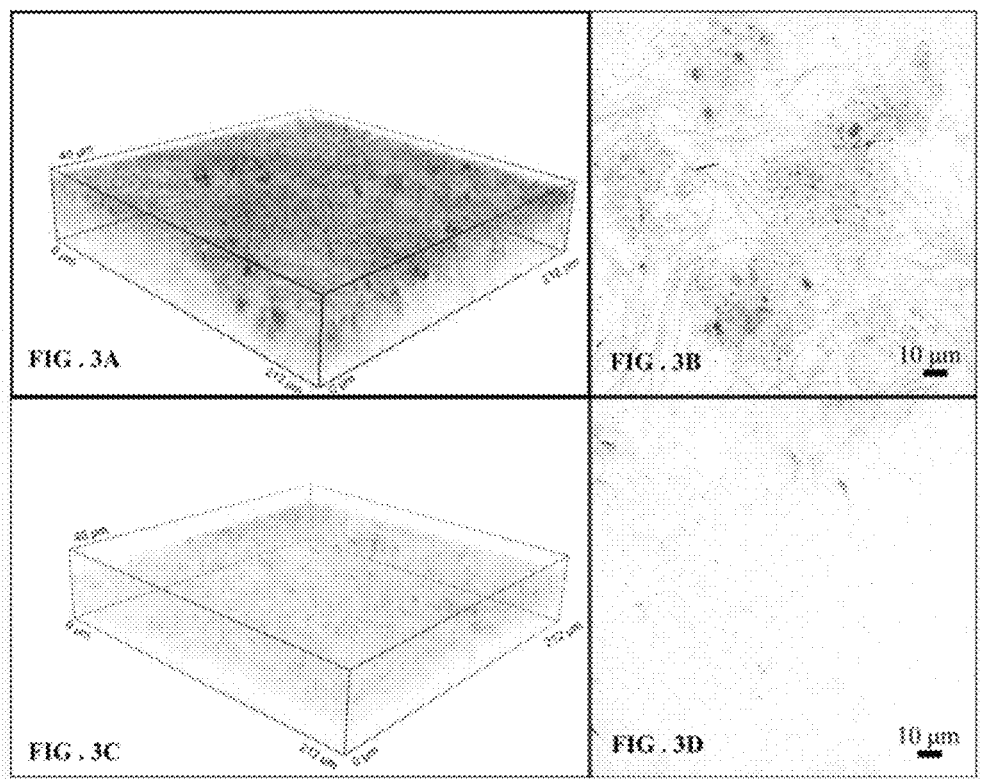
FIG. 3 is a graph indicating the content and distribution of foulants, and living cells on the membrane surface for the long-running membrane bioreactor in Example 4 using the polymeric separation membrane made by Example 1 and 2.

In order to overcome the deficiencies in the existing membrane separation technology, the present invention has developed a polymeric separation membrane with antibacterial ability and antifouling capability by adding quaternary ammonium salt into the casting solution.

Therefore, one object of the present invention is to prepare a polymeric separation membrane with persistent antibacterial ability and antifouling capability. After modification, the surface of the polymeric separation membrane can inhibit the growth and adhesion of bacteria and microorganisms. Additionally, the polymeric separation membrane has a significant antifouling capability.

Another object of the invention is to provide a method for preparing the polymeric separation membrane with persistent antibacterial ability and antifouling capability, which is simple process and can be easily operated and promoted.

This invention provides the modified polymer membrane with persistent antibacterial ability and antifouling capability.

The polymeric separation membrane is prepared by immersion precipitation phase inversion of quaternary ammonium salt, as an antibacterial agent, blends with the polymer, pore-forming agent and organic solvent.

The polymeric separation membrane is composed of polymer, quaternary ammonium salt and organic solvent. Taking the weight of polymeric separation membrane as the base, the polymeric separation membrane per 100 parts by weight contain 5~20 parts of polymer, 1~10 parts of the pore-forming agent, 0.1~5 parts of quaternary ammonium salt as antibacterial agent, and the rest is organic solvent.

The antibacterial agent i.e. quaternary ammonium salt may be alkyl dimethyl benzyl ammonium chloride, alkyl dimethyl benzyl ammonium bromide, cyano quaternary ammonium salt, polynitrogen heterocyclic quaternary ammonium salt, polymeric quaternary ammonium salt, or a mixture thereof. The mixing proportion of quaternary ammonium salt is 0.1%~5% by mass.

In the invention, taking the weight of polymeric separation membrane as the base, the polymeric separation membrane per 100 parts by weight contain 8~15 parts of polymer, 5~8 parts of the pore-forming agent, 1~2 parts of quaternary ammonium salt as antibacterial agent, and the rest is organic solvent.

The invention provides a process for forming a polymeric separation membrane with antibacterial ability and antifouling capability. The steps involved comprise the following:

(1) mixing the polymer, pore-forming agent and organic solvent in proportion and stirring at 75-85° C. for 50-55 hrs to form solution I;

(2) dissolving quaternary ammonium salt in the other organic solvent to get the solution II containing the antimicrobial agent;

(3) dropwise adding the solution II containing antibacterial agent prepared in step (2) into the solution I from step (1) under the 800-850 r/min rotating speed, and stirring well at 75-85° C. for 20-24 hrs, followed by deaerating in vacuum for 20-40 min room temperature (20-35° C.) to form the homogeneous casting solution;

(4) scraping the casting solution to prepare flat membrane at room temperature, and pre-evaporating the flat membrane in the air for 30-40 s, immersing in a coagulation bath for 20-24 hrs to form the membrane;

(5) washing with water to obtain the modified polymeric separation membrane.

In the invention, the polymer in the step (1) is selected from polyvinylidene fluoride, polytetrafluoroethylene, polyethersulfone, polyacrylonitrile or their mixture.

In the invention, the pore-forming agent in the step (1) is selected from polyvinyl pyrrolidone, polyethylene glycol, polyvinyl acetate or a mixture thereof.

In the invention, the organic solvent is selected from N,N-dimethylacetamide, N,N-dimethylformamide, dimethyl sulfoxide or a mixture thereof.

Compared with the existing technology, it is creative to use the broad-spectrum antibacterial agent quaternary ammonium salt for the preparation of polymeric separation membrane in this invention. One or a mixture of quaternary ammonium salts is added to modify the polymeric separation membrane, which successfully introduces antibacterial function to the polymeric separation membrane, furthermore, improves the antibacterial and antifouling performance of the polymeric separation membrane.

The method for the preparation of modified polymeric separation membrane with antibacterial ability and antifouling capability has the following advantages:

a method of preparing modified polymer membrane with antibacterial ability and antifouling capability. according to the method, the polymer membrane material combs the proprieties of quaternary ammonium salt that has dual functions of antibacterial and antifouling, prolonging the service life of the membrane;

(2) the preparing modified antibacterial polymer membranes with great antibacterial properties, which inhibits and kills microorganisms such as *Escherichia coli, Staphylococcus aureus;*

(3) compared with other antibacterial agents, the quaternary ammonium salt, as a new type of cationic surfactant, inhibiting microorganisms by contact, with a wider range of antibacterial, durable bacteriostatic effect and no drug resistance in the growth cycle of bacteria and microorganisms;

(4) simple process, easy operation and easy promotion for the blending method.

EMBODIMENTS

Detailed embodiments of the present invention are disclosed herein, however, it is to be understood that the disclosed embodiments are merely exemplary of the invention, which can be embodied in various forms. Therefore, the terms and phrases used herein are not intended to be limiting but rather to provide an understandable description of the invention.

Example 1

The preparation of PVDF membrane without modification: 21 g of polyvinylidene fluoride powder, 4 g of polyethylene glycol (M6000) were dissolved in 100 mL of dimethyl sulfoxide, stirred at 80° C., until the polyvinylidene fluoride powder and pore-forming agent completely dissolved. After that, the casting solution is obtained by deaeration in vacuum for 30 min at room temperature. The casting solution is poured on a glass plate, and scraped to form a flat membrane with thickness of 250 μm. The flat membrane was immersed in deionized water and coagulated at room temperature. The PVDF membrane without modification is obtained after separating from the glass plate.

Antibacterial performance test: Turbidimetric method was used to measure the antimicrobial activities of prepared PVDF membrane against *Escherichia coli* and *Staphylococcus aureus*. The operation is as follows: the PVDF membrane prepared by Example 1 was cut into a 1 cm diameter disk with a punch, immersed with deionized water for 24 hrs, then dried and saved in the multi-well plate. For the super-clean worktable, all the test facilities except the strains are sterilized for 20 min under the ultraviolet lamp.

The 0.8 mL of nutrient broth medium and 0.8 mL of the bacterial suspension were absorbed into the multi-well plate. The colorimetry of samples that were cultured by 37° C.

stationary temperature and shaken for different time was treated with enzymatic-reader at 600 nm.

The results show that the PVDF membrane without modification has no obvious inhibitory effect on *Escherichia coli* and *Staphylococcus aureus*. It can be seen from the figure, the quantity of *Staphylococcus aureus* and *Escherichia coli* in the nutrient broth medium increased with time. Therefore, it means that the PVDF membrane without modification can't inhibit the growth of *Escherichia coli* and *Staphylococcus aureus*.

Example 2

The preparation of PVDF membrane with antibacterial ability: 21 g of polyvinylidene fluoride powder, 4 g of polyethylene glycol (M6000) were dissolved in 100 mL of dimethyl sulfoxide, stirred at 80° C., until the polyvinylidene fluoride powder completely dissolved to form the solution I. 1.25 g of quaternary ammonium salt was dissolved in 20 mL of dimethyl sulfoxide to get the solution II. Under high rotating speed stirring, the solution II was added dropwise into the solution I. After that, the casting solution is obtained by deaeration in vacuum for 30 min at room temperature. The casting solution is poured on a glass plate, and scraped to form a flat membrane with thickness of 250 μm. The flat membrane was immersed in deionized water and coagulated at room temperature. The PVDF membrane with antibacterial ability was obtained after separating from the glass plate.

The antibacterial performance of PVDF membrane with antibacterial ability is tested as the same approach in Example 1.

The results show that the quantity of *Staphylococcus aureus* and *Escherichia coli* in the multi-well plates doesn't increase under constant temperature for 24 hrs and maintains at low level. It means that the PVDF membrane with antibacterial ability in Example 2 can inhibit the growth of *Escherichia coli* and *Staphylococcus aureus*.

Example 3

The preparation of PVDF membrane with antibacterial ability and antifouling capability: 21 g of polyethersulfone, 3 g of polyvinyl pyrrolidone were dissolved in 80 mL of N,N-Dimethylacetamide, stirred at 80° C., until the polyethersulfone completely dissolved to form the solution I. 2.5 g of quaternary ammonium salt was dissolved in 20 mL of N,N-Dimethylacetamide to get the solution II. Under high rotating speed stirring, the solution II was added dropwise into the solution I. After that, the casting solution is obtained by deaeration in vacuum for 30 min at room temperature. The casting solution is poured on a glass plate, and scraped to form a flat membrane with thickness of 250 μm. The polyethersulfone membrane with quaternary ammonium salt modification is obtained after separating from the glass plate.

The antibacterial performance of polyethersulfone membrane with quaternary ammonium salt modification is tested as the same approach in Example 1.

The results show that the polyethersulfone membrane with quaternary ammonium salt modification in Example 3 can inhibit the growth of *Escherichia coli* and *Staphylococcus aureus*.

Example 4

The stability test of antibacterial modified membrane in the bioreactor: membrane prepared by Example 1 and Example 2 were used in the membrane bioreactor which has been continuously operated in domestic wastewater treatment for 120 d, and the membrane flux was 20 L·m−2·h−1. The changes of transmembrane pressure (TMP) was recorded. When TMP rises to 30 kPa, the membrane is removed for chemical cleaning. To the end, a part of the membrane was dyed, and CLSM was used to observe and analyze the distribution of contaminants and living cells on membrane surface.

It can be seen from CLSM analysis that the quantity of living cells on surface of membrane made by Example 2 is fewer than by Example 1. That means the quaternary ammonium salt modified membrane has an excellent antibacterial effect, which was also proved by the results of Turbidimetric method. Besides, the quantity of polysaccharides, protein contaminants adhered to the surface of membrane made by Example 2 is fewer, which indicated that the quaternary ammonium modified separation membrane not only has antibacterial effect but also has significant antifouling effect.

The changes of membrane pressure also proved that: the cleaning cycle for the membrane made by Example 1 was about 25~30 d, and the cleaning cycle for the quaternary ammonium salt modified membrane such as Example 2 is extended to 55~60 d, which is about 2 times of the membrane without modification. It means that the quaternary ammonium salt modified polymeric separation membrane has a slow increase rate of membrane pressure and a significantly improvement of antifouling capability.

Having described the disclosure in detail, it will be apparent that modifications and variations are possible without departing from the scope of the disclosure defined in the invention.

The invention claimed is:

1. A polymeric separation membrane with antibacterial and antifouling capability, wherein the polymeric separation membrane is prepared by an immersion precipitation phase inversion method comprising:
   blending a quaternary ammonium salt, as an antibacterial agent, a polymer, a pore-forming agent and an organic solvent,
   per 100 parts by weight of the polymeric separation membrane containing 5-20 parts of the polymer, 1-10 parts of the pore-forming agent, 0.1-5 parts of the quaternary ammonium salt as the antibacterial agent, and the rest is the organic solvent,
   wherein the quaternary ammonium salt is a single molecule compound and selected from the group consisting of alkyl dimethyl benzyl ammonium chloride, alkyl dimethyl benzyl ammonium bromide, a cyano quaternary ammonium salt, a polynitrogen heterocyclic quaternary ammonium salt, and a mixture thereof, and the mixing proportion of the quaternary ammonium salt is 0.1%-5% by mass,
   wherein the polymer is selected from the group consisting of polyvinylidene fluoride, polytetrafluoroethylene, polyethersulfone, polyacrylonitrile and a mixture thereof,
   wherein the pore-forming agent is selected from the group consisting of polyvinyl pyrrolidone, polyethylene glycol, polyvinyl acetate and a mixture thereof, and
   wherein the organic solvent is selected from the group consisting of N,N-dimethylacetamide, N,N-dimethylformamide, dimethyl sulfoxide and a mixture thereof.

2. The polymeric separation membrane of claim 1, wherein the per 100 parts by weight of the polymeric separation membrane contain 8-15 parts of the polymer, 5-8 parts of the pore-forming agent, 1-2 parts of the quaternary ammonium salt as the antibacterial agent, and the rest is the organic solvent.

3. A process for forming a polymeric separation membrane with antibacterial and antifouling capability, comprising steps of:
(1) mixing a polymer, a pore-forming agent and an organic solvent in proportion and stirring at 75-85° C. for 50-55 hrs to form a solution I,
  wherein the polymer is selected from the group consisting of polyvinylidene fluoride, polytetrafluoroethylene, polyethersulfone, polyacrylonitrile and a mixture thereof,
  wherein the pore-forming agent is selected from the group consisting of polyvinyl pyrrolidone, polyethylene glycol, polyvinyl acetate and a mixture thereof, and
  wherein the organic solvent is selected from the group consisting of N,N-dimethylacetamide, N,N-dimethylformamide, dimethyl sulfoxide and a mixture thereof;
(2) dissolving a quaternary ammonium salt in another organic solvent to get a solution II,
  wherein the quaternary ammonium salt is selected from the group consisting of alkyl dimethyl benzyl ammonium chloride, alkyl dimethyl benzyl ammonium bromide, a cyano quaternary ammonium salt, a polynitrogen heterocyclic quaternary ammonium salt, and a mixture thereof; and
  wherein per 100 parts by weight of components used to form the polymeric separation membrane contain 5-20 parts of the polymer, 1-10 parts of the pore-forming agent, 0.1-5 parts of the quaternary ammonium salt as an antibacterial agent, and the rest is the organic solvent;
(3) dropwise adding the solution II prepared in step (2) into the solution I from step (1) under the 800-850 r/min rotating speed, and stirring well at 75-85° C. for 20-24 hrs, followed by deaerating in vacuum for 20-40 min room temperature (20-35° C.) to form a homogeneous casting solution;
(4) scraping the casting solution to prepare a flat membrane at room temperature, pre-evaporating the flat membrane in the air for 30-40 s, and immersing the flat membrane in a coagulation bath for 20-24 hrs to form a coagulated membrane; and
(5) washing the coagulated film with water to obtain the modified polymeric separation membrane.

* * * * *